(12) United States Patent
Winkelmann

(10) Patent No.: US 9,206,787 B2
(45) Date of Patent: Dec. 8, 2015

(54) WIND TURBINE

(75) Inventor: Joerg Winkelmann, Wardow (DE)

(73) Assignee: Suzlon Energy GmbH, Rostock (DE)

( * ) Notice: Subject to any disclaimer, the term of this patent is extended or adjusted under 35 U.S.C. 154(b) by 672 days.

(21) Appl. No.: 13/509,124

(22) PCT Filed: Nov. 15, 2010

(86) PCT No.: PCT/EP2010/067517
§ 371 (c)(1),
(2), (4) Date: Jun. 26, 2012

(87) PCT Pub. No.: WO2011/058184
PCT Pub. Date: May 19, 2011

(65) Prior Publication Data
US 2012/0263594 A1    Oct. 18, 2012

(30) Foreign Application Priority Data

Nov. 13, 2009  (DE) .......................... 10 2009 052 809
Nov. 20, 2009  (DE) .......................... 10 2009 053 757

(51) Int. Cl.
*F03D 1/00*     (2006.01)
*F03D 11/02*    (2006.01)
*F16H 1/28*     (2006.01)

(52) U.S. Cl.
CPC ............ *F03D 11/028* (2013.01); *F16H 1/2818* (2013.01); *F16H 1/2845* (2013.01); *F05B 2260/40311* (2013.01); *F05B 2260/96* (2013.01); *Y02E 10/722* (2013.01)

(58) Field of Classification Search
CPC .................... F05B 2260/40311; F16H 1/2809; F16H 1/2818
See application file for complete search history.

(56) References Cited

U.S. PATENT DOCUMENTS 7,935,020 B2 *   5/2011  Jansen et al. ................... 475/338
2004/0038770 A1 * 2/2004  Flamang et al. .............. 475/348
(Continued)

FOREIGN PATENT DOCUMENTS

| CN | 101255849 A | 9/2008 |
| CN | 101375052 A | 2/2009 |
| DE | 23 41 250 A1 | 2/1985 |

(Continued)

OTHER PUBLICATIONS

German Office Action dated Nov. 15, 2011.
(Continued)

*Primary Examiner* — Nathaniel Wiehe
*Assistant Examiner* — Woody A Lee, Jr.
(74) *Attorney, Agent, or Firm* — Norris McLaughlin & Marcus PA

(57) ABSTRACT

A wind turbine is provided with a rotor, a substantially horizontal rotor shaft, with a machine frame, with output means for dissipating the rotation energy of the rotor; wherein the output means are formed as ring gear or planet carrier of a gear box; the rotor shaft is connected in a rotation-fixed manner to the machine frame; the rotor has a hub and at least one rotor blade attachable thereto, is rotatably supported on the rotor shaft, and is connected substantially in a rotation-fixed manner to the output means; wherein decoupling connecting means are effectively arranged between the output means and the rotor, so as to substantially prevent the transmitting of radial, axial and/or tilting motions from the rotor onto the output means.

15 Claims, 9 Drawing Sheets

(56) References Cited

U.S. PATENT DOCUMENTS

| | | | |
|---|---|---|---|
| 2012/0045336 A1* | 2/2012 | Castell Martinez | 416/170 R |
| 2012/0184404 A1* | 7/2012 | Chobot et al. | 475/347 |

FOREIGN PATENT DOCUMENTS

| | | |
|---|---|---|
| DE | 44 02 184 A1 | 8/1995 |
| DE | 199 30 751 A1 | 1/2001 |
| DE | 102 24 439 A1 | 12/2003 |
| DE | 103 18 945 B3 | 10/2004 |
| DE | 10 2004 030929 B3 | 10/2005 |
| DE | 10 2004 064 007 B4 | 8/2009 |
| EP | 1 045 140 A2 | 10/2000 |
| EP | 1 855 001 A1 | 11/2007 |
| WO | 01/59296 A1 | 8/2001 |
| WO | 2007/082970 A1 | 7/2007 |

OTHER PUBLICATIONS

International Search Report Dated Sep. 27, 2011, mailed Oct. 7, 2011.

* cited by examiner

WIND TURBINE

This application is a 371 application of PCT/EP2010/067517 filed Nov. 15, 2010, which claims foreign priority benefit under 35 U.S.C. §119 of German applications. 10 2009 052 809.1 filed Nov. 13, 2009 and 10 2009 053 757.0 filed Nov. 20,2009.

TECHNICAL FIELD

The invention relates to a wind turbine with a rotor, wherein the rotor is about a rotational axis rotatably supported on a substantially horizontal rotor shaft. The rotor comprises a hub and preferably three rotor blades attached thereto. The rotor blades are in favorable manner but not necessarily, about its longitudinal axis rotatably supported on a hub, whereby the angle of attack of the rotor blades can be varied. The hub is rotatably mounted on the rotor shaft directly or via a connecting member, wherein the rotor shaft in turn is fixedly connected to a machine frame of the wind turbine. The machine frame accommodates the machine house and the components presented therein. In addition, the machine frame is rotatably arranged on a tower of the wind turbine via the so-called azimuth bearing. The rotor is connected in a rotation-fixed manner to an output means, such as a gear box or a generator.

BACKGROUNDS

Such a wind turbine is known from DE 10 2004 064 007 A1, wherein the output means formed as a large generator are directly driven by a rotor without temporarily stored gear box. To keep the air gap in large generator as constant as possible, the entire drive train and the bearing can be made extremely rigid to prevent the only smallest deformation of the system comprising the drive train and large generator. This leads to a complex, very heavy and expensive construction of the wind turbine.

From the Chinese patent application CN 101255849 A is a wind turbine having the features discussed at the beginning known. Here, the output means are formed as a ring gear, which is in operative engagement with smaller gears, which in turn are each connected to a generator. Also in this case present the above problems that the entire system must be designed extremely rigid, therefore must be heavy and expensive. Then the geometry of engagements of the tooth flanks of the ring gears and the smaller gears must be kept as constant as possible to maintain low friction and wear.

SUMMARY OF INVENTION

It is an object of the invention to provide a wind turbine, which avoids the disadvantages of the prior art, wherein a simple, light and cheap construction of the drive train are particularly possible.

The object is achieved with the features of the independent claim 1, wherein decoupling connecting means are effectively provided between the output means and the rotor. These have the effect that from the rotor only circumferential forces or torque can be transmitted to the output. Otherwise, the rotor and output means are substantially decoupled within a certain degree in terms of transfer of the translational motions, especially of radial, axial or tilting motions. In this context, the rotational motion of the rotor, i.e., the motion in the circumferential direction does not count to the above-mentioned translational motions.

Positional and directional statements, such as axial, radial and tangential direction refer to the rotational axis of the rotor.

When, for example, the rotor is so acted upon by gusty and turbulent winds, that the rotor shaft bends or the hub make a translational and/or tilting motions, so the connection means prevent that these displacements are transmitted to the output means.

An embodiment of the invention teaches that the output means are rotatably supported on the rotor shaft directly via a bearing. When the rotor is for this also supported on the rotor shaft via at least one bearing in an independent manner from the drive means, the effect of decoupling is particularly good, because the separate supporting of output means and rotor prevent the gear box disturbing radial, axial or tilting motion very effectively.

It is also conceivable that the rotor is supported on the rotor shaft at least partially via the driven means. In this case, the rotor is supported on the rotor shaft, at least partially, via the decoupling connection means and via the output means. In this manner, a bearing can be canceled.

When the output means is embodied as a part of a gear box, for example as a ring gear or as a rotatable planet carrier, so the wear or destruction of the gear box is prevented.

The invention includes, among other things, that the gear box for transmitting the rotor speed comprises a ring gear, at least two planet wheels and a sun wheel. Since the sun wheel is connected to an output shaft, the transmitted rotation speed can be coupled in a working machine, for example, in a generator. The rotor is connected in a rotation-fixed manner with the ring gear, wherein in particular the rotor and the ring gear are supported together or separately on the rotor shaft. The ring gear is in operative engagement with the planet wheels that in turn cooperate with the sun wheel. The invention comprises that the planet wheels directly or indirectly engage effectively with the sun wheel. In a situation of direct effective engagement, the gear box corresponds to the gear box of a classic planet wheel from the perspective of structure.

Advantageously, the gear box includes three or four planet wheels, because of this it will cause that the ring gear is better supported via the planet wheels, i.e., that radial and circumferential force is transferred to a planet carrier. Moreover, also the sun wheel and the output shaft are supported in the radial direction through the planet wheels.

An embodiment of the invention discloses that the planet carrier is arranged in the wind turbine in a rotation-fixed way relative to the machine frame or the rotor shaft.

Another aspect of the invention is that junctures for power transfer are provided between the rotor shaft and the machine frame, wherein the number of effective junctures is at least equal to the number of planet wheels. It's also conceivable—but not necessarily—that the planet wheels are supported in a transition region of the rotor shaft to the junctures, which means that the planet carrier is formed directly with the rotor shaft, preferably as an integral component. To achieve an optimal gear box behavior, the ring gear, planet wheels and the sun wheel are formed as gears.

Independently from the above detailed features for embodying the driven means as gear box, the invention also comprises that the output means are designed as a stator or rotor of a generator. In particular, no gear box for transmitting the rotation speed is provided between the generator and the rotor. Here the advantages are that shifting or tilting of the rotor are not transferred to the generator, and thus the air gap in the generator remains substantially constant, and thus can be designed very small. This leads to an increase in the efficiency of the generator and to a reduction of the weight of the wind turbine, because the drive train and bearings can be designed less rigid.

Within the scope of the invention it is not disclosed in the way of not limiting by the above-described embodiments that the connecting means comprise resiliently or flexible structural components or assemblies, so that these translational and tilting motions between the rotor and the output means can be received into themselves and compensated.

It is conceivable, for example, to form the connecting means as at least one strut. These struts are movably connected at their ends to the hub and at another end to output means in such a way that circumferential forces are transferable between the hub and the drive means by pulling or compressing, but radial, axial and/or tilting motions of the hub are compensated by a displacement of the strut on the hub and/or on the output means.

The struts may be molded in a rod-shape and the connecting means can comprise further damping means which are effectively positioned between the strut and the hub and/or between the strut and the output means. Here ball and/or rod joints can be provided between the strut and the hub or the output means, which have elastomeric elements to enable the displacement and thereby also act in the way of damping.

Another embodiment of the invention cites that hub and the output means each have a corresponding support surface, wherein the supporting surfaces extend partly in the axial direction and/or in radial direction and is undercut in the circumferential direction in such way that the supporting surfaces are suitable to transfer circumferential forces between the hub and the output means. In particular, the decoupling effect is particularly effective when the support surfaces extend substantially in the axial direction and/or in radial direction. In this embodiment it allows the axial characteristic of the supporting surfaces, so that a form-fit connection between the hub and driven means is provided, which is effective in substantially only in the circumferential direction. Therefore, radial, axial and/or tilting motions of the hub are at least not transferable in form-fit way, but it will consciously allow a relative motion possibility of the hub to the output means.

Preferably elastic structural components are arranged between the supporting surfaces, whereby the transfer of circumferential forces is improved. This construction is very simple yet highly effective, since very few components are used.

The transfer of circumferential forces or torque is particularly advantageous if at least two, preferably three connecting means are provided, which are provided between the rotor and the output means preferably being uniformly distributed over the circumference.

Here, the connection means can be constructed in particular as bush with an elastomeric body and a bolt. The bolt here is embedded in the elastomeric body, whereby a certain clearance is allowed for the bolt. In the range of the clearance, the connecting means can receive the relative motions between the rotor and the output means in itself. In addition, the connection means have a damping and balancing effect in terms of rotational torque entry and torque transfer into the output means.

For example, a portion of the bush comprising the elastomeric body is here arranged directly in the hub or a supplementary component provided thereon. In this case, the bolt is fastened directly to the output means or in a supplementary component provided thereon, such as a gear box- or generator bell jar. A reverse arrangement of the fasteners is also conceivable.

Further details of the invention will become apparent from the drawings on the basis of the description.

EMBODIMENTS

Figure 1:
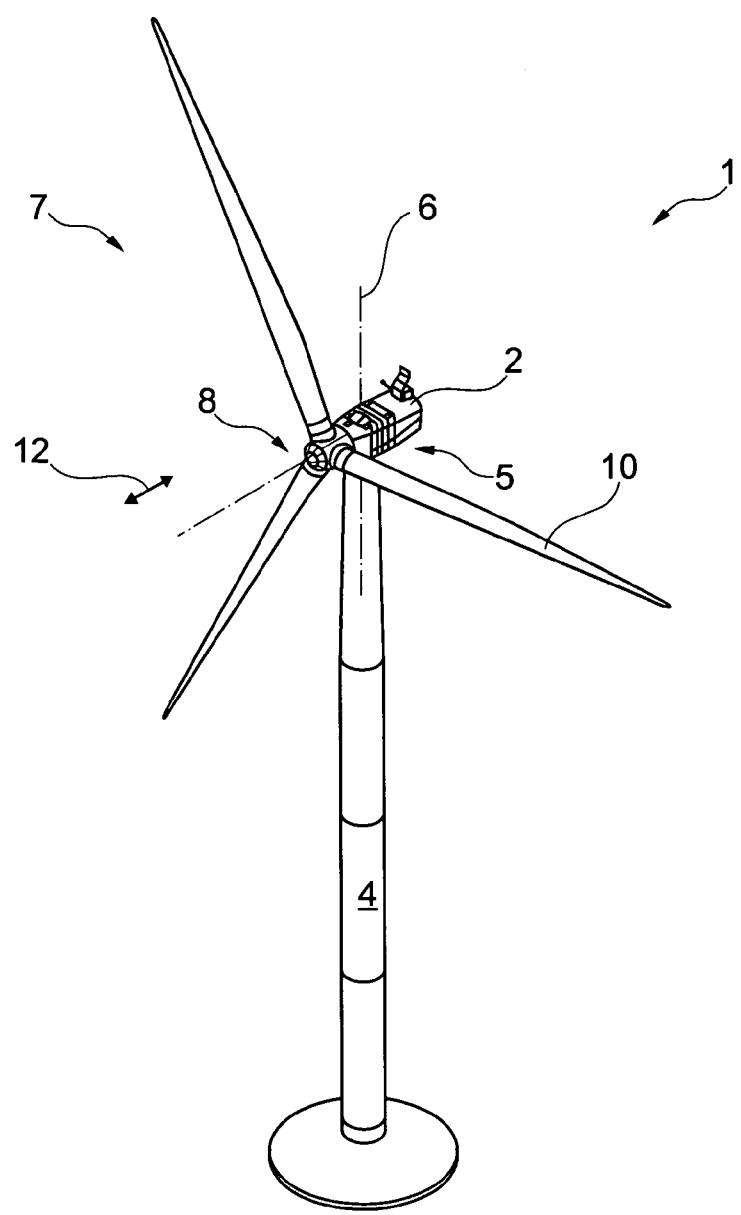
FIG. 1 shows an exemplary wind turbine.

To make the context of the invention clear, an exemplary wind turbine 1 is shown in FIG. 1. This comprises a tower 4, a machine housing 2 and a rotor 7, wherein the machine housing 2 is supported rotatably about a substantially vertical axis 6 on the tower 4 by means of an azimuth bearing 5, to allow a wind tracking. The rotor 7 is rotatably arranged on the machine housing 2, the rotor comprises a hub 8, on which preferably three rotor blades 10 are arranged again. The rotor 7 is supported on the machine frame 3 by the rotor shaft 11 and drives a generator 32 for producing electric current.

Figure 2:
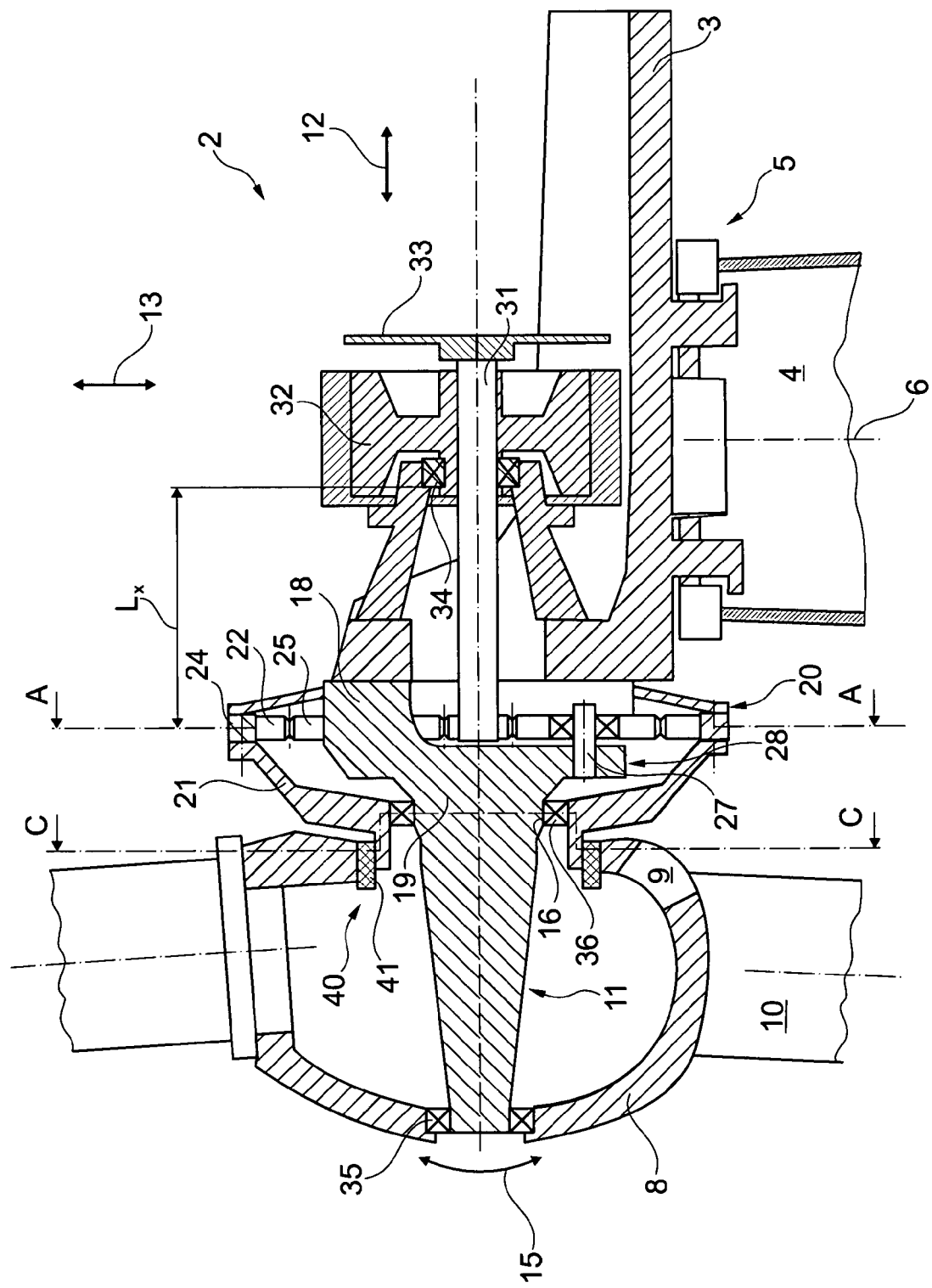
FIG. 2 shows a first embodiment of the wind turbine.

FIG. 2 shows a first embodiment of the wind turbine 1. However, the details described below refer substantially to the other embodiments. In FIG. 2 it shows primarily the machine housing 2, the rotor shaft 11, the gear box 20 and the rotor 7. A machine frame 3 in the machine housing 2 is connected with the azimuth bearing 5, whereby the machine housing 2 is supported rotatably about the axis 4 on the tower 4 of the wind turbine 1 via the azimuth bearing 5. The preferably cone-shaped rotor shaft 11 in turn is arranged in a rotation-fixed manner on the machine frame 3 via junctures 18, wherein the rotor shaft 11 and the junctures 18 may be formed in one piece. The hub 8 is rotatably supported on the rotor shaft 11, which extends substantially horizontally. The hub 8 comprises an access opening 9 to allow access of the installers into the hub 8 in case of maintenance. For orientation, an axial direction 12, a radial direction 13 and a circumferential direction 14 are defined with respect to this axis of rotation or the rotor shaft 11 of the rotor 7, which is also valid for the following embodiments.

The hub 8 of the rotor 7 is connected in a rotation-fixed manner with a ring gear 22 of a gear box 20 via decoupling connecting means 40 or even 60, 70, 90 through a gear box bell jar 21, wherein the gear box bell jar 21 and the ring gear 22 can be formed in one piece. Thus, the ring gear 22 performs the same rotation as the rotor 7. The rotational motion of the ring gear 22 is further transmitted to planet wheels 25, which are rotatably supported in a planet carrier 28 by means of bearing pins 27. The planet carrier 28 is provided in a rotation-fixed manner relative to the machine frame 3, in particular, the planet carrier 28 can be formed according to FIG. 2 by a transition region 19 of the rotor shaft 11 towards the junctures 18, according to FIG. 9 via a separate planetary carrier 78 or according to another non-illustrated embodiment, directly by the machine frame. So, to some extent, the ring gear 20 is supported via the planetary gears 25 on the machine frame 3.

In the present embodiments, three planet wheels 25 are provided, wherein this shall not limit this invention, but also four, five or six planet wheels are conceivable.

The ring gear 22 is connected to the housing 24 and the gear box bell jar 21, and forms a structural unit which is in a rotation-fixed manner connected with the hub 8 via the connecting means 40 and consequently rotates together with the rotor 7. The initial rotation motion of the rotor 7 is transmitted via the ring gear 22 onto the planet wheels 25 and - now at a higher rotation speed - transmitted onto the sun wheel 29 in the center of the gear box 20. The sun wheel 29 is connected to an output shaft 31, which further transmits the rotation to a generator 32 at medium, increased rotation speed for producing electric current. The output shaft 31 is preferably provided with a brake disc 33, wherein a non-illustrated brake device can act upon this for mechanically braking of the drive train.

The output shaft 31 is either supported directly in the machine frame and/or on the machine frame 3 via a common bearing 34 with the generator 32. The common bearing 34 of generator 32 and output shaft 31 is particularly simple and beneficial in terms of manufacturing and assembly of the wind turbine 1. This combined bearing 34 can be used very well here, since the three or more planet wheels 25 also present a effective bearing in the radial direction 13, so a further bearing near the sun wheel 29 may be canceled. Between the bearing 34 of the output shaft 31 and the sun wheel 29, there is an axial misalignment Lx. Through the way that the output shaft 31 can slightly deform elastically, the sun wheel 29 is capable of carry out a radial motion between the planet wheels 25 to a limited degree, thusly ensuring a similar load situation between the planet wheels 25. This reduces the wear of the planet wheels 25 and sun wheel 29.

Figure 3:
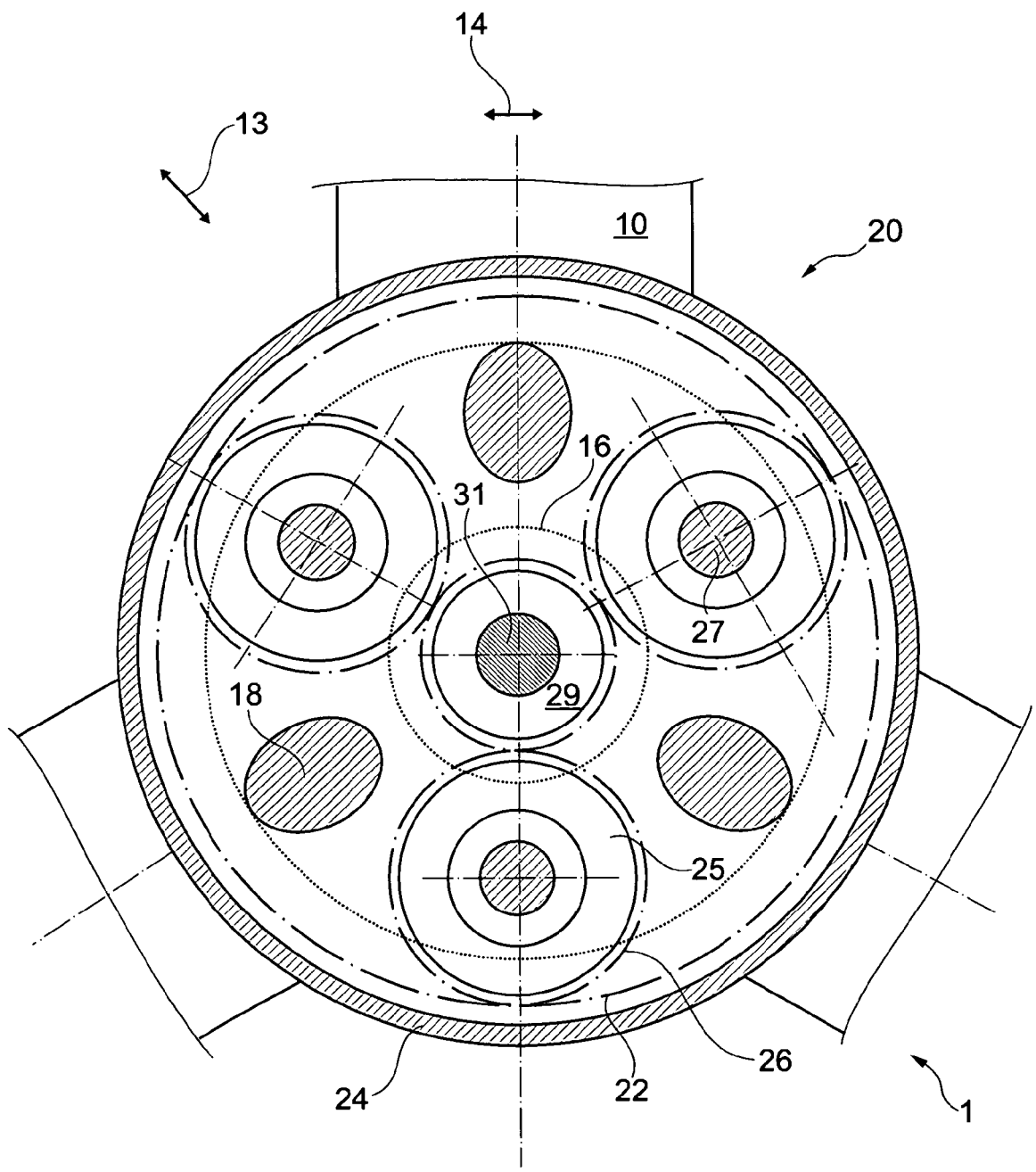
FIG. 3 shows a section A-A through the embodiment shown in FIGS. 2 and 9.

FIG. 3 shows a simplified section through the gear box 20 along the line A-A of FIG. 2. Since the present embodiments do not differ significantly with respect to the gear box 20, this also applies for the embodiment according to FIG. 9 or FIG. 13.

In FIG. 3, it can be seen that the housing 24 of the ring gear 22 is adjacent to the rudimentary illustrated rotor blades 9, wherein the ring gear 22 is shown only with help of the center circle of dot-dash line 23 representing the tooth 23. The housing may be formed integrally with the ring gear. However, it is conceivable to shrink the ring gear 22 as a full-ring into the housing 24 or to introduce the ring gear into the housing 24 in segments via the form fit or friction fit.

Radially further inwards, a dotted line 19 can be seen, which represents the transition region 19 between the rotor shaft 11 and the three junctures 18. This transition area 19 is used in the embodiment shown in FIG. 2 as a holder for the bearing pin 27 and therefore as a planet carrier 28. The rotor shaft 11 for supporting the hub 8 and the ring gear 22, transition region 19 formed as a planet carrier 28, and the junctures 18 for fixing on the machine frame 3 then form an integral structural unit which can be manufactured as a cast, for example. However, it can also be advantageous in terms of assembly and manufacture that this structural unit is made of several parts.

The planet wheels 25 engage in the tooth 23 of ring gear 22, and the tooth 30 of the sun wheel 29, wherein the tooth 26 of the planet wheels 25 is shown as a dash-dot line 25 (center circle). Radially further inward a further dotted line 16 can be recognized, which represents the rotor shaft 11 and the running surface 16 of the bearing 36 of the gear box bell jar 21 on the rotor shaft 11.

Figure 6:
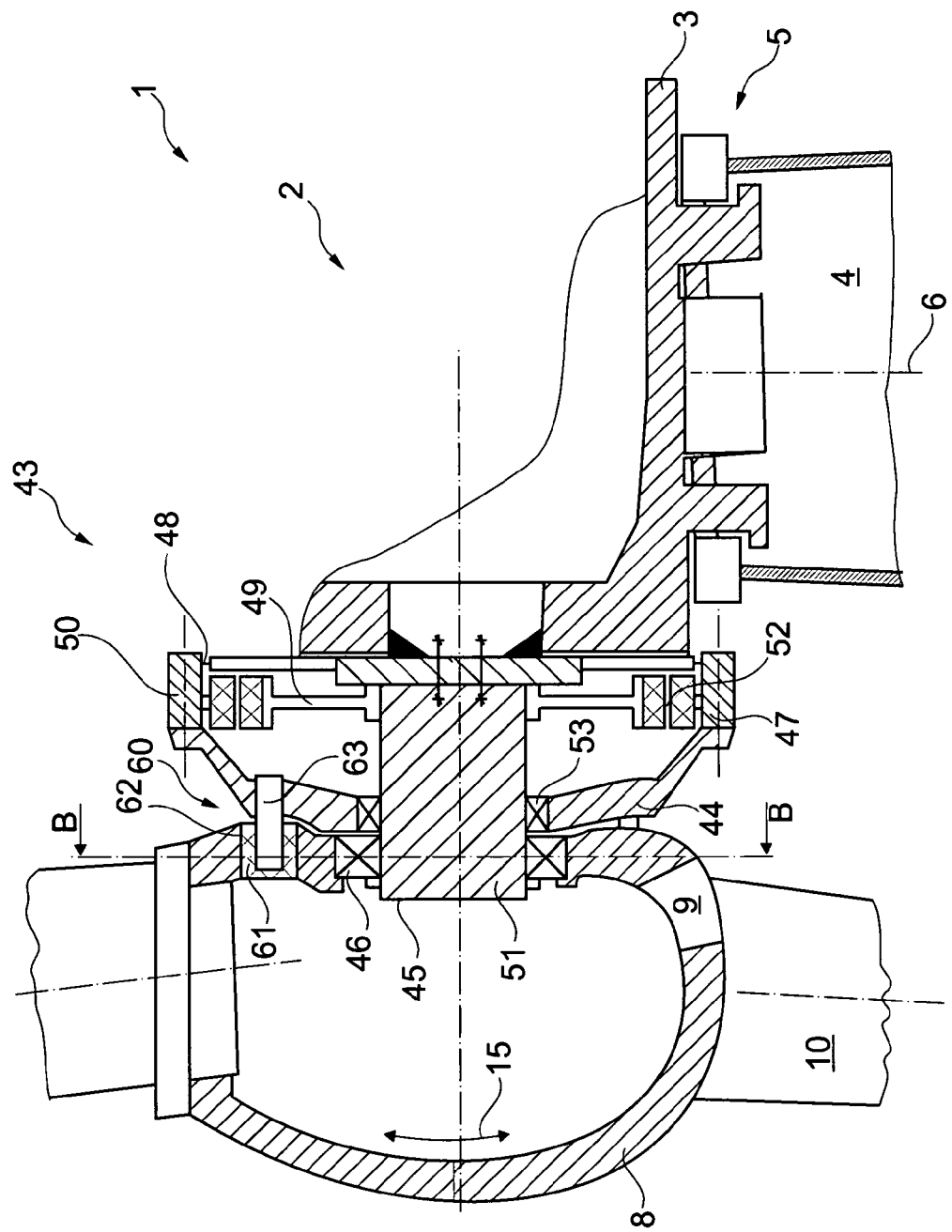
FIG. 6 shows a second embodiment of the wind turbine.

The above embodiments can be essentially applied to all wind turbines 1 shown in FIG. 2, 9, 13 and in terms of the supporting and decoupling of the hub 8 can also be applied for the embodiment shown in FIG. 6, wherein the output means is not constructed as a gear box bell jar, but as a generator bell jar 44. In the following, the main differences of the present embodiments are now given - these differences concern the supporting of the hub on the rotor shaft, the formation of the planet carrier and the use of a gear box and the connecting means between the output means 20, 21, 43, 44 and the hub 8. The characteristic differences disclosed in following embodiments are not tied to the particular embodiment and shall not limit the invention, but it rather also makes sense that the characteristics of different embodiments can be combined with each other. In particular, the different forms of direct or indirect supporting of the hub on the rotor shaft or the different types of coupling of rotational connection between the hub and the various characteristics of output means can be combined as gear box with different planet carriers. It should be emphasized that these characteristics do not necessarily relate to a wind turbine 1 as above, but can also relate to wind turbines 1, which for example, instead of the gear box and the ring gear directly have a large generator 43 in accordance with FIG. 6. In connection with the above-described wind turbine 1, the following characteristics show particularly advantageous.

In FIG. 2, the hub 8 is supported on the running surface 16 of the rotor shaft 11 via a direct bearing 35 at the tip 17 of the rotor shaft 11 and indirectly via a bearing 36 of the gear box bell jar 21 of the ring gear 22. Since together with the tip 17, the hub 8 can perform a motion 15 caused by bending, which shall not be transmitted to the ring gear 22, decoupling and/or damping connecting means 20 are provided between the hub 8 and the gear box bell jar 21. These make it possible that a substantially rotation-fixed connection is established between the hub 8 and gear box bell jar 21 or ring gear 22, but no significant axial, radial and tilting motions 15 can be transmitted. Such motions 15 would cause that the engagement of the ring gear 22 and the planet wheels 25 would be very irregular and variable, so that it would lead to a very high wear of the tooth 23 and 26 or to the destruction of the gears. The embodiment in FIG. 2 requires that the connecting means 20, the hub 8 and the gear box bell jar 21 do not decouple in terms of motions 15 in radial direction 13. Because the hub 8 is supported via the bearing 36 of the gear box bell jar 21 or of the ring gear 22 in a combined manner, wherein radial support is indispensable. The connecting means 20 can also dampen torsional vibrations.

Figure 4:
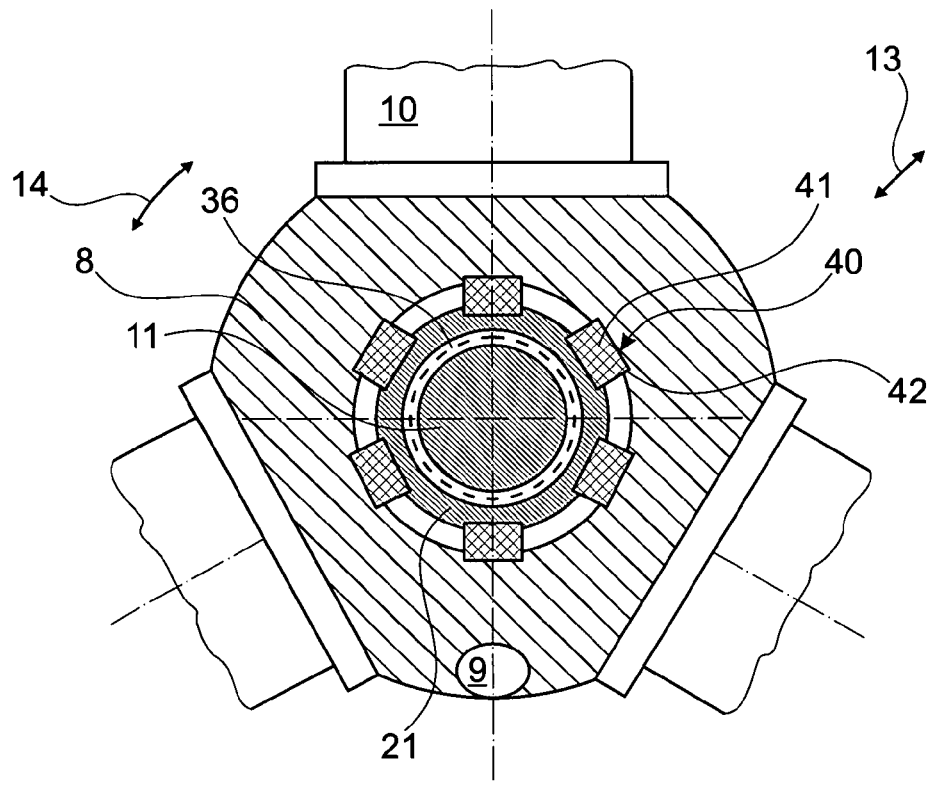
FIG. 4 shows a section C-C through the embodiment shown in FIG. 2.
Figure 5:
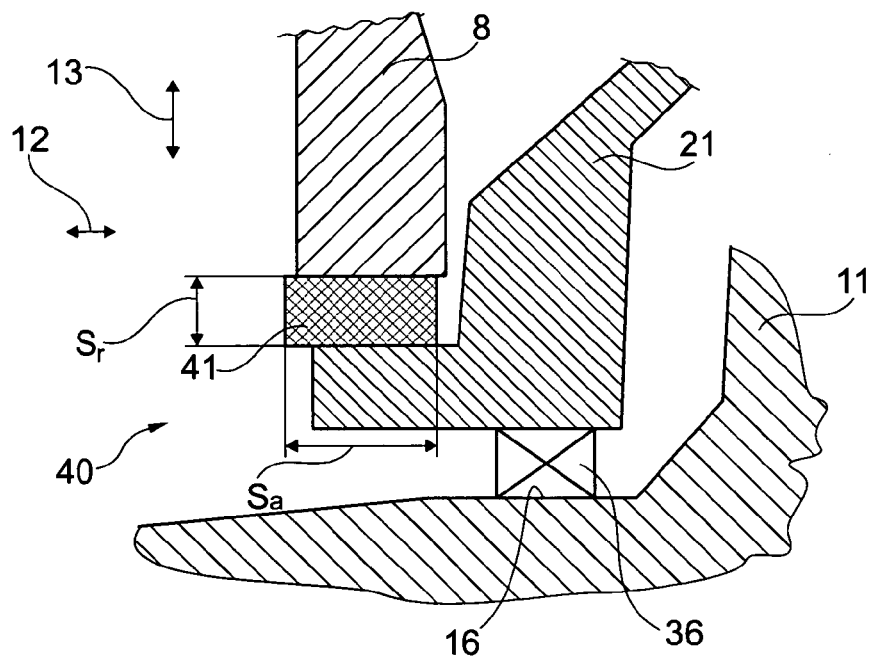
FIG. 5 shows a detailed longitudinal section through the embodiment of FIG. 2.
Figure 9:
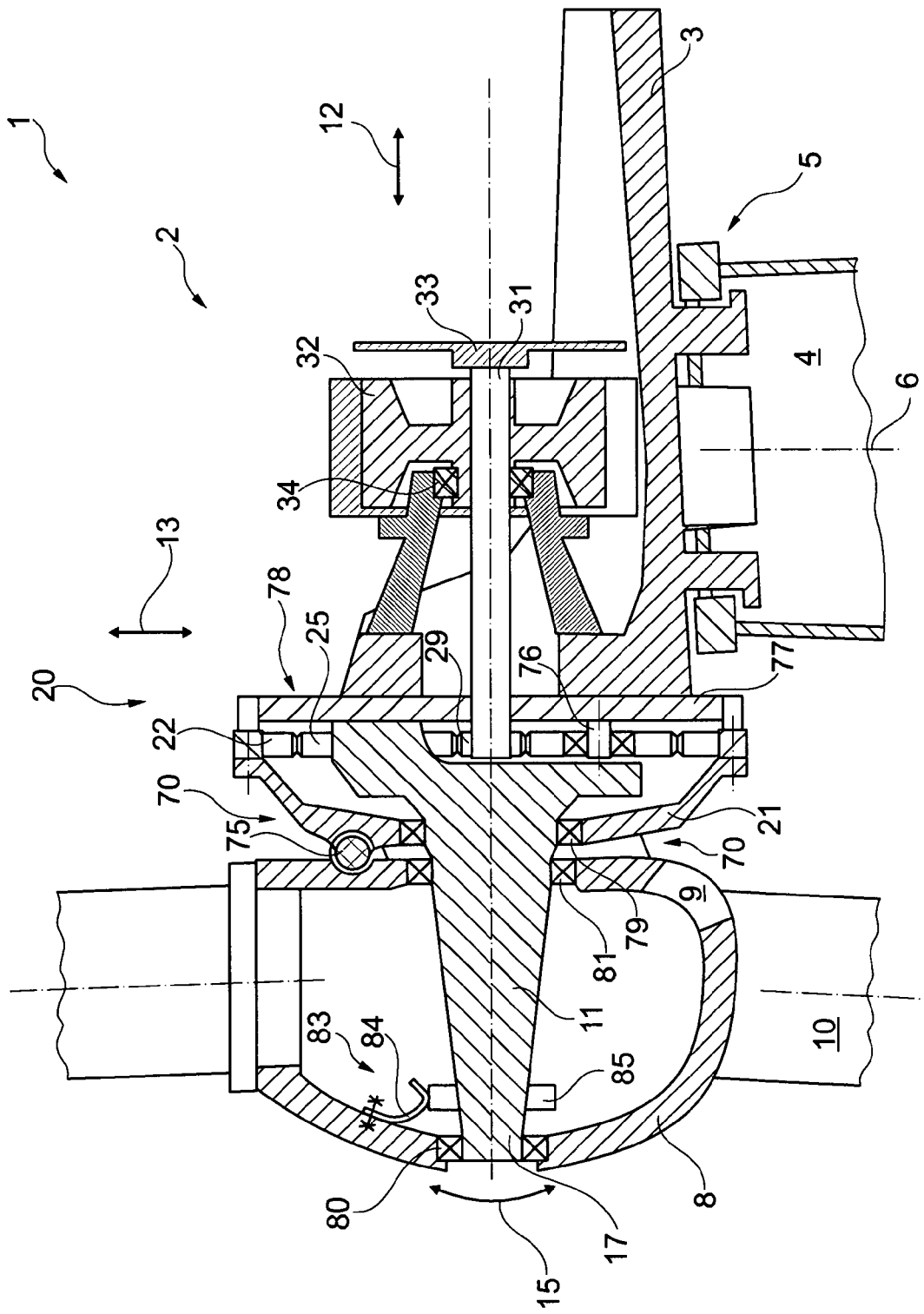
FIG. 9 shows a third embodiment of the wind turbine.

With help of section C-C (FIG. 4) and FIG. 5, the decoupling connecting means 20 according to FIG. 2 are shown in detail. This concept is also applicable in a wind turbine 1 without gear box and/or with a torque bearing 46 and stub shaft 45 (FIG. 6) or in a wind turbine 1 with multiple bearings of the hub 8 (FIG. 9). The connecting means 20 are here formed as one or more elastomeric body 41 which is located directly between the gear box bell jar 21 and the hub 8 - like a shaft-hub connection with several fitting keys. For this purpose, in the hub 8 and in the gear box bell jar 21, grooves 42 are provided to be distributed over the circumference, in which the elastomeric bodies 41 are arranged in form or frictional fitting manner. To allow a larger compensatory capacity of the elastomeric body 21 in the axial direction 12 than in the radial direction 13, the axial thickness $S_a$ of the elastomeric body 41 is preferably greater than its radial thickness $S_r$. Preferably, the elastomeric body has a high stiffness in the radial direction 13 and in the circumferential direction 14, but has a very low stiffness or high elasticity in the axial direction 12. Thus, the supporting in the radial direction 13 and the force transferring in the circumferential direction 14 would be direct and reliable, nevertheless the compensation ability in axial direction 12 is still high for motions 15.

The embodiment according to FIG. 6 has a rotor shaft 51, which is designed as a stub shaft 45 without tip. Instead of this, the rotor 7 is supported over the hub 8 via a so-called torque bearing 46 on the stub shaft 45. This leads to a reduction in the weight of the rotor shaft 51 and simultaneously increases the structural space within the hub 8, to accommodate drive components for the adjustment of attack angle of the rotor blades 9. This supporting concept is also conceivable in the embodiments of a wind turbine with a gear box 20 according to FIGS. 2, 9 and 13.

In FIG. 6, the wind turbine 1 comprises, instead of a gear box, a large generator 43 with a generator bell jar 44 with a generator housing 47 and sealing means 48. Here, the stator 50 of the generator 43 is fixedly connected to the housing 47 or the generator bell jar 44 and thus fulfills the rotation of the rotor 7. A generator rotor 49 is fixedly connected to the stub shaft 45. Since the generator bell jar 44 is via its own bearing 53 supported on the rotor shaft 51 and thus also the stator 50 are decoupled with the rotor 7, the air gap 52 between the stator 50 and the generator rotor 49 can not be significantly affected by axial, radial or tilting motions 15 of the rotor 7. It is also conceivable but not shown that the rotor 7 drives the generator rotor, for example rotatably supported on the rotor shaft, which is encompassed by a radially outer or axially offset arranged fixed stator.

Figure 7:
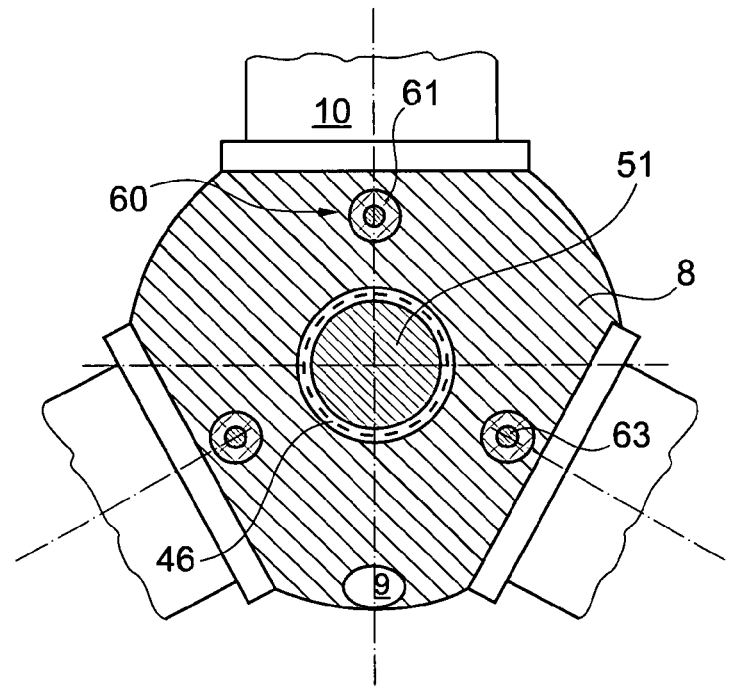
FIG. 7 shows a section B-B through the embodiment of FIG. 6.
Figure 8:
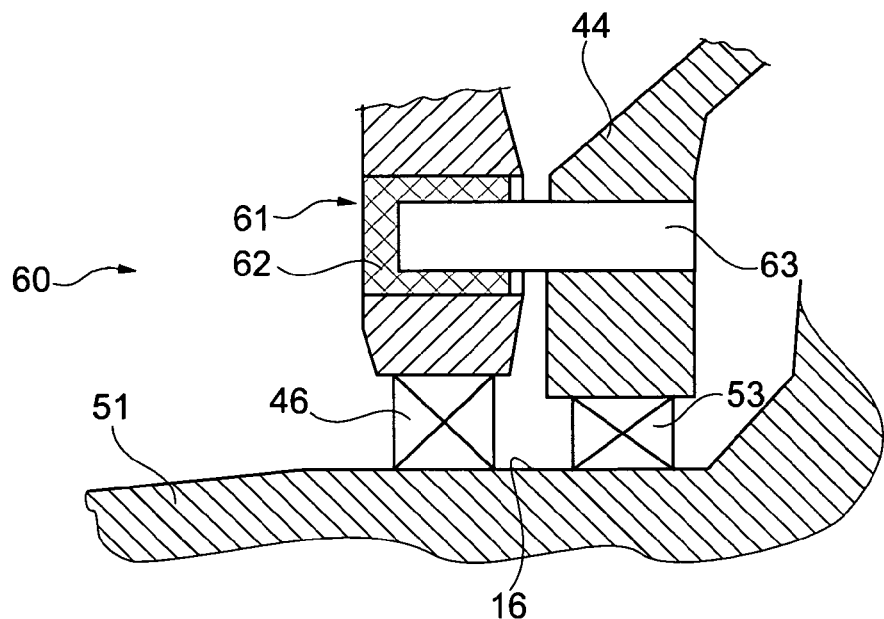
FIG. 8 shows a detailed longitudinal section through the embodiment of FIG. 6.

The connecting means 60 according to FIGS. 6, 7 and 8 are embodied as for example bush 61, wherein an elastomeric body 62 is arranged in or on the hub 8, or in the gear box bell jar (not shown). The elastomeric body 62 in turn accommodates a bolt 63, which is arranged firmly in the output means formed as the gear box bell jar 44 or in the hub (not shown). Here, the bush 61 is constructed in such a manner that the bolt 63 is relatively flexibly supported in the axial direction 12 and/or in the radial direction 13, but not in the circumferential direction 14. With reference to FIG. 8 it is clear that for this purpose the axial thickness $S_a$ of the elastomeric body 40 is greater than its radial thickness $S_r$. Preferably, at least three such bushes 61 are provided between hub 8 and gear box bell jar or generator bell jar 44.

With reference to FIG. 9 a further embodiment of the invention is introduced, wherein the hub 8 is supported on the rotor shaft 11 by means of two direct, separate bearing 80, 81. Conveniently, one of the bearings 80, 81 is embodied as fixed bearing and one as floating bearing. The gear box bell jar 21 and the ring gear 22 have their own independent bearing 79 for supporting on the rotor shaft 11. Decoupling connection means 70 with regard to axial and radial motions 15 are now arranged between the hub 8 and the ring gear 22.

According to FIGS. 9, 10, 11 and 12, the connecting means 70 are designed in such way that the hub 8 and the output means, such as the gear box bell jar 21 have supporting means 71 and 73, which overlap in the axial direction 12 but offset in the circumferential direction 14. Corresponding supporting surfaces 72 and 74 are respectively provided on the support means 71 of the hub 8 and the support means 73 of the gear box bell jar 21. These supporting surfaces 72, 74 extend substantially in the axial direction 12 and radial direction 13, wherein they engage behind in the circumferential direction 14 in the assembled state of the rotor 7, so that the connection means 70 are suitable to transmit circumferential forces between the hub 8 and gear box 21 via the supporting surfaces 72 and 74. This embodiment makes it possible to build a form fit between the hub 8 and output means, here gear box bell jar 21, which is substantially only effective in the circumferential direction 14. Thus, radial, axial and/or tilting motions 15 of the hub 8 are at least not transferable in a form fit way, but it allows a relative motion possibility of the hub 8 relative to the gear box bell jar 21 in a conscious manner.

Elastomeric bodies 75 are preferably provided between these supporting surfaces 72, 74 of the hub 8 and the gear box bell jar 21, which although transmit circumferential forces from the hub 8 onto the gear box bell jar 21, and vice versa, but an axial and radial displacement of the hub 8 and the gear box bell jar 21 to each other is allowed in some degree. Therefore, a beneficent and effective gear box of the rotational motion without transferring the harmful radial and axial motions 15 is achieved.

Preferably, the mounted elastomeric body 75 has a high rigidity in the circumferential direction 14, and particularly preferably a very low stiffness and a high elasticity in the axial direction 12 and/or in radial direction 13. Therefore, the supporting in the radial direction 13 and the force transferring in the circumferential direction 14 would be direct and reliable, the compensation ability in axial direction 12 are still high for motion 15.

Figure 10:
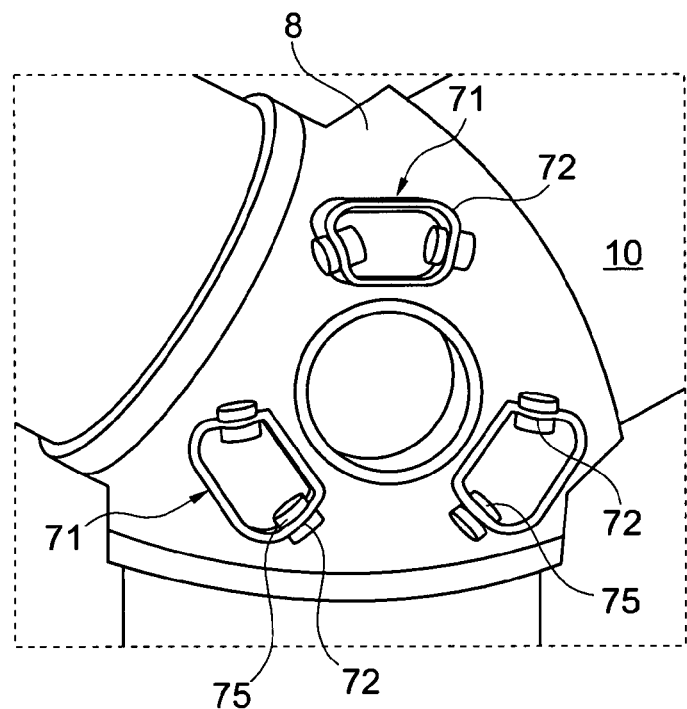
FIG. 10 shows a perspective view of the hub shown in FIG. 9.
Figure 11:
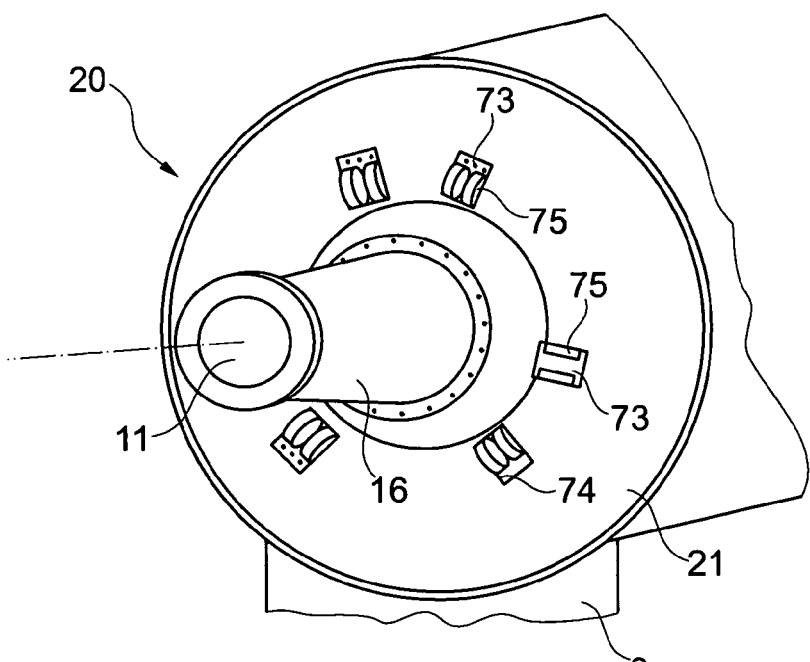
FIG. 11 shows a perspective view of the rotor shaft shown in FIG. 9.
Figure 12:
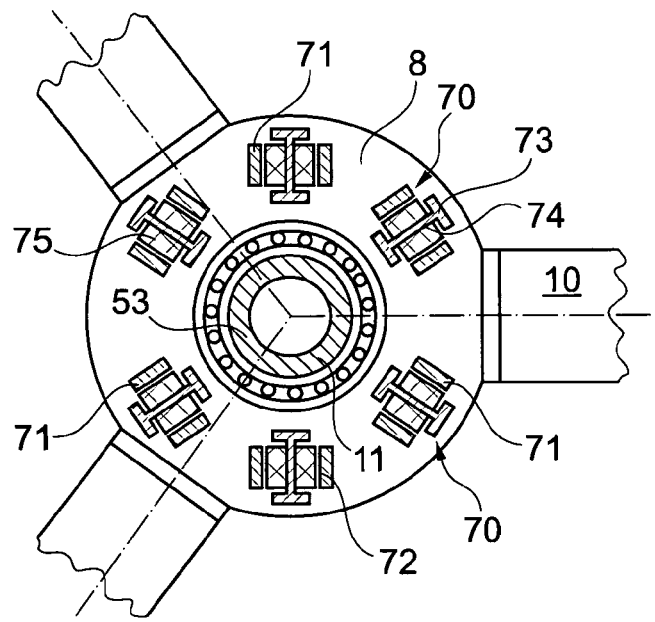
FIG. 12 shows a section D-D through the embodiment of FIG. 9.

In FIG. 10 it can be seen that the supporting means are formed on the side facing to the gear box 20 of the hub 8 as projections 71, to which the elastomeric bodies 75 are fixed. Accordingly, support means 73 serving as recesses 73 are provided on the gear box bell jar 21 or generator bell jar. The projections 71 of the hub 8 engage into these recesses 73 in the axial direction 12.

In order to enable a beneficent manufacture of the individual components, as in FIG. 9 an independent characteristic of the planet support 78 is proposed. This consists essentially of a disc 77, which in turn carries the bearing pin 76 of the planet wheels 25. This disc 77 can be very accurately and inexpensively produced by turning and/or milling processes, and therefore mounted on the machine support 3 by screw connections. As the disc 77 of the planet carrier 78 also receives the junctures 18 of the rotor shaft 11, mainly by screw connections, the disc 77 and the axial spacing of the individual gears of the gear box 20 defines, which are highly relevant to the functioning and life of the gearbox 20. Sealing means 79 are arranged between the disc 77 of the planet carrier 78 and the housing 24 of the ring gear 22.

FIG. 9, but also in all other embodiments conceivable, furthermore shows a gear box device 80 to transfer the electrical energy between the hub 8 rotating relative to the rotor shaft 11. This device 80 formed as slip ring apparatus includes one or more collectors 81 rotating with the hub 8 and the slip ring 82 connected with the hub 8. The multi-pole slip ring 82 is connected with the power supply system via cable, and is connected with the control equipment of wind turbine 1 to transfer the control signals.

Figure 13:
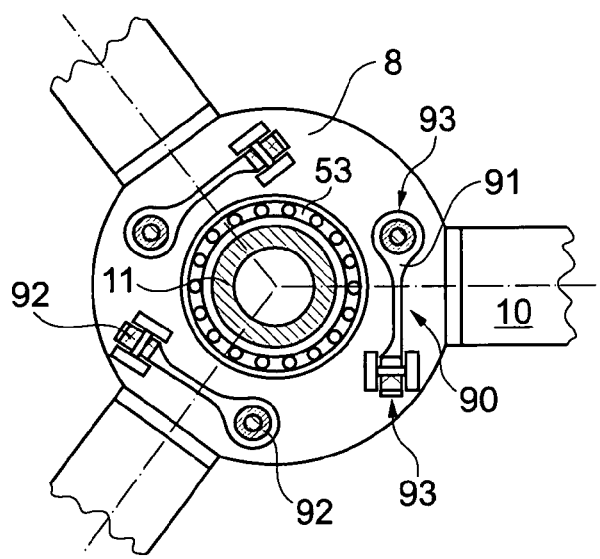
FIG. 13 shows a section through a further embodiment of the connecting means.

FIG. 13 leads to a last embodiment of the connection means 90. Here, the connection means 90 is designed as elastically acting or flexible structural components or assemblies, e.g., as at least one strut 91, which can receive into itself and compensate the translational and tilting motions 15 between the rotor 7 and the output means 20, 21, 43, 44. The struts 91 are movably connected to the hub 8 at their ends and at another end are connected to said output means 20, 21, 43, 44, so that circumferential forces are transferable between the hub 8 and the output means 20, 21, 43, 44 by pull or pressure, but radial, axial and/or tilting motions 15 of the hub 8 are compensated by a moving of the strut 91 on hub 8 and/or on the output means 20, 21, 43, 44. The struts 91 can be molded in rod-shape. Furthermore, the connecting means 90 further comprise damping means 92 which are effectively disposed between the strut 91 and the hub 8 and/or between the strut 91 and the output means 20, 21, 43, 44. Here ball and/or rod joints 93 can be provided between the strut 91 and the hub 8 or the output means 20, 21, 43, 44, comprise elastomeric elements 92, so as to allow the moving possible and thereby also act in the way of damping.

The feature combinations disclosed in the described embodiments herein shall not limit the invention, but rather the features of different embodiments can combined with each other.

LIST OF REFERENCE SIGNS

| 1 | wind turbine |
|---|---|
| 2 | machine housing |
| 3 | machine frames |
| 4 | Tower |
| 5 | azimuth bearing |
| 6 | axis |
| 7 | rotor |
| 8 | hub |
| 9 | access opening |
| 10 | rotor blade |
| 11 | rotor shaft |
| 12 | axial direction |
| 13 | radial direction |
| 14 | circumferential direction |
| 15 | motion |
| 16 | acting surface |
| 17 | tip |
| 18 | junctures |
| 19 | transition area |
| 20 | gear box |
| 21 | gear box bell jar |
| 22 | ring gear |
| 23 | tooth |
| 24 | housing |
| 25 | planet wheel |
| 26 | tooth |
| 27 | bearing pin |
| 28 | planet carrier |
| 29 | sun wheel |
| 30 | tooth |
| 31 | output shaft |
| 32 | generator |
| 33 | break disc |
| 34 | bearing |
| 35 | bearing |
| 36 | bearing |
| 40 | connecting means |
| 41 | elastomeric body |
| 42 | grooves |
| 43 | large generator |
| 44 | generator bell jar |
| 45 | stub axle |
| 46 | torque bearing |
| 47 | generator housing |
| 48 | sealing means |
| 49 | generator rotor |
| 50 | stator |
| 51 | rotor shaft |
| 52 | air gap |
| 53 | bearing |
| 60 | connecting means |
| 61 | bush |
| 62 | elastomer body |
| 63 | bolts |
| 70 | connecting means |
| 71 | supporting means |
| 72 | supporting face |
| 73 | supporting means |
| 74 | supporting face |
| 75 | elastomeric body |
| 76 | bearing pin |
| 77 | disc |
| 78 | planet carrier |
| 79 | bearing |
| 80 | bearing |
| 81 | bearing |
| 82 | sealing means |
| 83 | transfer device |
| 84 | collector |
| 85 | slip ring |
| 90 | connecting means |
| 91 | strut |
| 92 | damping means |
| 93 | joint |
| $L_x$ | axial offset |
| $S_a$ | axial thickness |
| $S_r$ | radial thickness |

The invention claimed is:

1. A wind turbine comprising a rotor, a substantially horizontal non-rotating rotor shaft, a machine frame, and an output means for dissipating rotation energy generated by the rotor,
wherein:
a) the output means are formed as rotating ring gear of a gear box,
b) the non-rotating rotor shaft is connected in a rotation-fixed manner to the machine frame,
c) the rotor has a hub and at least one rotor blade attachable thereto, the rotor is rotatably supported on the non-rotating rotor shaft, and the rotor is connected substantially in a rotation-fixed manner to the output means,
and wherein decoupling connecting means are effectively arranged between the output means and the rotor, so as to substantially prevent the transmitting of radial, axial and/or tilting motions from the rotor onto the output means.

2. The wind turbine according to claim 1, wherein the output means is rotatably supported on the non-rotating rotor shaft directly via a bearing.

3. The wind turbine according to claim 2, wherein the rotor is at least partly via the output means supported on the non-rotating rotor shaft.

4. The wind turbine according to claim 2, wherein the rotor is supported on the non-rotating rotor shaft via at least one bearing in a manner independent from the output means.

5. The wind turbine according to one of the preceding claims, wherein the connecting means are formed as at least one strut, and this strut is movably connected to the hub at one end in such a manner and to the output means at the other end in such a manner, that circumferential forces are transferable by pull or pressure between the hub and the output means, but the radial, axial and/or tilting motions of the hub are compensated by a deflection of the strut on hub and/or on the output means.

6. The wind turbine according to claim 5, characterized in that the connecting means comprise damping means, which are effectively disposed between the strut and the hub and/or between the strut and the output means.

7. The wind turbine according to claim 1, wherein the connecting means comprise elastic components.

8. The wind turbine according to claim 7, wherein the hub and the output means each have a corresponding supporting surface, wherein the supporting surfaces partially extend in the axial direction and are untercut in the circumferential direction in such a way, that the supporting surfaces are suitable to transfer circumferential forces between the hub and the output means.

9. The wind turbine according to claim 8, wherein supporting surfaces extend substantially in the axial direction.

10. The wind turbine according to claim 9, wherein the elastic components are arranged between the supporting surfaces.

11. The wind turbine according to claim 1, wherein at least two connecting means are provided between the rotor and output means in a way of uniformly distributing over the circumference.

12. The wind turbine according to claim 1, wherein the connecting means are formed as bush with an elastomeric body and a bolt.

13. The wind turbine according to claim 1, wherein the rotating ring gear is in operative engagement with planet wheels which cooperate with a sun wheel, and the sun wheel is connected with an output shaft, wherein planet wheels are supported on a planet carrier, which is provided rotation-fixedly relative to the machine frame on the wind turbine.

14. The wind turbine according to claim 1, wherein the gear box comprises a planet carrier, and wherein the planet carrier and the non-rotating rotor shaft are connected in a rotation-fixed manner to the machine frame.

15. The wind turbine according to claim 14, wherein the decoupling connecting means comprises elastomeric elements.

* * * * *